US007143108B1

(12) United States Patent
George (10) Patent No.: US 7,143,108 B1
(45) Date of Patent: Nov. 28, 2006

(54) APPARATUS AND METHOD FOR DELETION OF OBJECTS FROM AN OBJECT-RELATIONAL SYSTEM IN A CUSTOMIZABLE AND DATABASE INDEPENDENT MANNER

(75) Inventor: Joseph Mulavelil George, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,274

(22) Filed: Apr. 6, 2000

(51) Int. Cl.
*G06F 17/30* (2006.01)

(52) U.S. Cl. ..................... 707/104.1; 707/10

(58) Field of Classification Search .............. 707/1–10, 707/100–104.1
See application file for complete search history.

(56) References Cited

U.S. PATENT DOCUMENTS

| | | | | |
|---|---|---|---|---|
| 4,506,326 A | | 3/1985 | Shaw et al. ................. 365/300 |
| 4,947,320 A | * | 8/1990 | Crus et al. .................. 707/201 |
| 5,185,885 A | | 2/1993 | Dysart et al. ............... 395/600 |
| 5,226,158 A | * | 7/1993 | Horn et al. ................. 707/201 |
| 5,291,583 A | | 3/1994 | Bapat ......................... 395/500 |
| 5,412,774 A | * | 5/1995 | Agrawal et al. ............... 707/4 |
| 5,706,506 A | | 1/1998 | Jensen et al. ............... 395/614 |
| 5,717,924 A | | 2/1998 | Kawai ......................... 395/613 |
| 5,832,268 A | | 11/1998 | Anderson et al. ........... 395/701 |
| 5,832,498 A | * | 11/1998 | Exertier ...................... 707/103 |
| 5,878,411 A | * | 3/1999 | Burroughs et al. ............ 707/4 |
| 5,930,795 A | | 7/1999 | Chen et al. .................. 700/100 |
| 6,047,284 A | * | 4/2000 | Owens et al. .................. 707/4 |
| 6,061,692 A | * | 5/2000 | Thomas et al. ............. 707/200 |
| 6,163,776 A | * | 12/2000 | Periwal ........................ 707/4 |
| 6,199,195 B1 | * | 3/2001 | Goodwin et al. ........... 707/100 |
| 6,327,628 B1 | * | 12/2001 | Anuff et al. .................. 707/9 |
| 6,374,252 B1 | * | 4/2002 | Althoff et al. .............. 707/102 |

(Continued)

OTHER PUBLICATIONS

"Fundamentals of Database Systems—Third Edition" Elmasri and Navathe, copyright 1997 (pp. 209-211 and pp. 734-739).*
Text Book: Funamentals of Database System (Third Edition) of Ramez Elmasri and Shamkant B. Navathe from Addition-Wisley.*

(Continued)

*Primary Examiner*—Jean M. Corrielus
*Assistant Examiner*—Anh Ly
(74) *Attorney, Agent, or Firm*—Duke W. Yee; Jeffrey S. LaBow; Francis Lammes (57) ABSTRACT

An apparatus and method for deleting objects from an object-relational system in a customizable and database independent manner. The apparatus and method provide a customizable and database independent mechanism for the deletion of object data from a relational database. The method implemented by the apparatus determines the dependency structure of a relational database using database metadata. The dependency structure is then utilized to determine the type of deletion to be performed on data representations of the object and its related objects, i.e., parent or child objects. The deletion actions include cascade deletion and nullify columns deletion. Appropriate SQL statements are then automatically generated at run-time to perform the deletion of the object data from the relational database.

40 Claims, 6 Drawing Sheets

U.S. PATENT DOCUMENTS

| | | | |
|---|---|---|---|
| 6,374,256 B1 * | 4/2002 | Ng et al. | 707/103 |
| 6,385,618 B1 * | 5/2002 | Ng et al. | 707/103 Y |
| 6,418,448 B1 * | 7/2002 | Sarkar | 707/104.1 |
| 6,456,995 B1 * | 9/2002 | Salo et al. | 707/1 |
| 2003/0009431 A1 * | 1/2003 | Souder et al. | 707/1 |
| 2003/0204514 A1 * | 10/2003 | Owens et al. | 707/100 |
| 2004/0098406 A1 * | 5/2004 | Roddy | 707/103 R |
| 2005/0076094 A1 * | 4/2005 | Sasaki et al. | 709/217 |

OTHER PUBLICATIONS

Generic Dynamic SQL Application Programming Interface Set; Hidalgo; International Business Machines Technical Disclosure Bulletin; V. 36, No. 8, pp. 573-578.

Core Java 2 vol. II—Advanced Features; Horstmann et al., pp. 203-253; 2000.

* cited by examiner

XML Dependency MetaInfo

```xml
<Table name="Author">
    <PrimaryKey>
        <Field name="Author_ID" type="VARCHAR2"></Field>
    </PrimaryKey>
    <Dependent Name="BookAuthor">
        <ForeignKey>
            <Attribute pos="1">
                <Parent>Author_ID</Parent>
                <Child>Author_ID</Child>
            </Attribute>
        </ForeignKey>
        <Delete_Action>NULLIFY COLUMNS</Delete_Action>
    </Dependent>
</Table>
```
⎫
⎬ 810
⎭

```xml
<Table name="BookAuthors">
    <PrimaryKey>
        <Field name="ISBN" type="VARCHAR2"</Field>
    </PrimaryKey>
    <Dependent name="Book">
        <ForeignKey>
            <Attribute pos="1">
                <Parent>ISBN</Parent>
                <Child>ISBN</Child>
            </Attribute>
        </ForeignKey>
        <Delete_Action>CASCADE DELETE</Delete_Action>
    </Dependent>
</Table>
```
⎫
⎬ 820
⎭

```xml
<Table name="Book">
    <PrimaryKey>
        <Field name="ISBN" type="VARCHAR2"</Field>
    </Primary>
</Table>
```
⎫
⎬ 830
⎭

*FIG. 8A*

```
<Table_Definition>
    <Table name="ACL">
        <PrimaryKey>
            <Field name="ACLNAME" type="VARCHAR2"></Field>
        </PrimaryKey>
        <Dependent name="ACL_ENTRY">
            <ForeignKey>
                <Attribute pos="1">
                    <Parent>ACLNAME</Parent>
                    <Child>ACLNAME</Child>
                </Attribute>
            </ForeignKey>
            <Delete_Action><CASCADE DELETE</Delete_Action>
            <Delete_Constraint>unauthenticated = 0</Delete_Constraint>
        </Dependent>
    </Table>                                                            } 870
    <Table name="ACL_ENTRY">
        <PrimaryKey>
            <Field name="ACLNAME"type="VARCHAR2"></Field>
            <Field name="ELEMENTNAME" type="VARCHAR2"></Field>
        </PrimaryKey>
        <Dependent name="PERMISSIONROLEMAP">
            <ForeignKey>
                <Attribute pos="1">
                    <Parent>ACLNAME</Parent>
                    <Child>ACLNAME</Child>
                </Attribute>
                <Attribute pos="2">
                    <Parent>ELEMENTNAME</Parent>
                    <Child>ELEMENTNAME</Child>
                </Attribute>
            </ForeignKey>
            <Delete_Action><CASCADE DELETE</Delete_Action>
        </Dependent>
    </Table>                                                            } 880
    <Table name="PERMISSIONROLEMAP">
        <PrimaryKey>
            <Field name="ACLNAME" type="VARCHAR2"></Field>
            <Field name="ELEMENTNAME" type="VARCHAR2"></Field>
            <Field name="MGMTSRVID" type="VARCHAR2"></Field>
            <Field name="ROLEID" type="NUMBER"></Field>
        </PrimaryKey>
    </Table>                                                            } 890
```

FIG. 8B

APPARATUS AND METHOD FOR DELETION OF OBJECTS FROM AN OBJECT-RELATIONAL SYSTEM IN A CUSTOMIZABLE AND DATABASE INDEPENDENT MANNER

BACKGROUND OF THE INVENTION

1. Technical Field

The present invention is directed to an apparatus and method for deletion of objects from an object relational system in a customizable and database independent manner. In particular, the present invention is directed to deletion of data representations of objects stored as records in a relational database and modification or deletion of records of child objects of the deleted record.

2. Description of Related Art

In an object-relational system, i.e. a system having applications containing objects whose attributes are defined in a relational database, the state of an object is stored as a record in a relational database table. In the relational database, there are foreign-key constraints, or dependency constraints, that ensure the integrity of the data. When a data representation of an object is deleted from the relational database the deletion of the underlying database record must abide by the database constraints, i.e. if there are any dependencies, the deletion must be handled accordingly.

Traditionally, this has been handled by database triggers which represent a custom and non-portable, i.e. database-specific, solution to ensure database integrity. However, this solution does not lend itself to a heterogeneous environment. Thus, for example, a relational database, such as Oracle, is used to define triggers for deletion of data representations of objects in the relational database. These same triggers will not be useable if the underlying relational database system is changed to IBM DB2. In other words, the same triggers cannot be used for the deletion of data representations of objects in a plurality of different relational database systems, since they are written in database-specific languages.

Thus, it would be beneficial to have an apparatus and method for the deletion of objects in a relational database that is customizable and not database-specific.

SUMMARY OF THE INVENTION

The present invention provides an apparatus and method for deleting data representations of objects from a relational database. The apparatus and method provide a customizable and database independent mechanism for the deletion of data representations of objects from a relational database. When the terms "object data stored in a relational database," "object data in a relational database", or the like, are used herein, what is meant is that the data representations of the objects are stored as records in a relational database and the deletion of the "object data" is the deletion of the data representations of the objects from the relational database.

The present invention involves determining the dependency structure of a relational database using database metadata (i.e. information about the tables and their relationships). The dependency structure is then utilized to determine the type of deletion to be performed on an object and data representations of its related objects, i.e. parent or child objects. The delete actions include cascade deletion and nullify columns.

Cascade deletion involves the deletion of the object data and all data representations of objects that are related to that object data, i.e. all child objects and child objects of those objects as well. This dependency tree is recursive structure with leaf objects that do not have any dependents. Nullify columns deletion action involves the deletion of the object data and the nullification (severing) of links to child object data. Which deletion to perform is customizable through selection by a user.

The invention produces a dependency tree in the form of a markup language file with default delete actions derived by means of certain heuristics. These heuristics identify default deletion operations, either cascade or nullify columns, to be performed on data representations of objects and the child object data of these data representations. A user may choose to override the default cascade deletion or nullify columns deletion action for each data representation of an object in the relational database. In addition, the user may select additional deletion constraints identifying which objects are to be deleted.

The database dependency structure and the deletion mechanism for the database objects is provided to a database meta-information generator tool that creates a database meta-information class that encapsulates the dependency structure and deletion mechanism information. At run-time, a depth-first traversal of the dependency information in the database meta-information class is used to generate relevant Structured Query Language (SQL) commands. The SQL commands are used to execute the appropriate deletion actions in the relational database. The cascade deletion action results in a "delete" SQL command while the nullify columns deletion action results in an "update . . . set . . . =null" SQL command.

The present invention provides a mechanism by which data representations of objects may be deleted within the constraints established by content of the relational database. Furthermore, the present invention provides a mechanism by which the deletion of data representations of objects may be performed in a customizable manner. Additionally, the present invention is operable for deletion of data representations of objects in a heterogeneous environment in which relational databases of different types are utilized.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
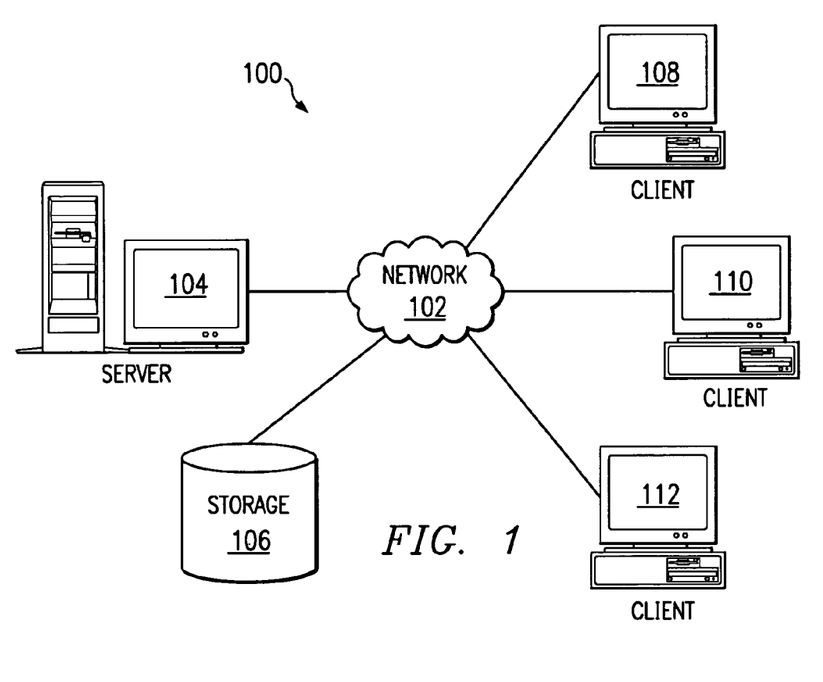
FIG. 1 is a diagram illustrating a distributed data processing system according to the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
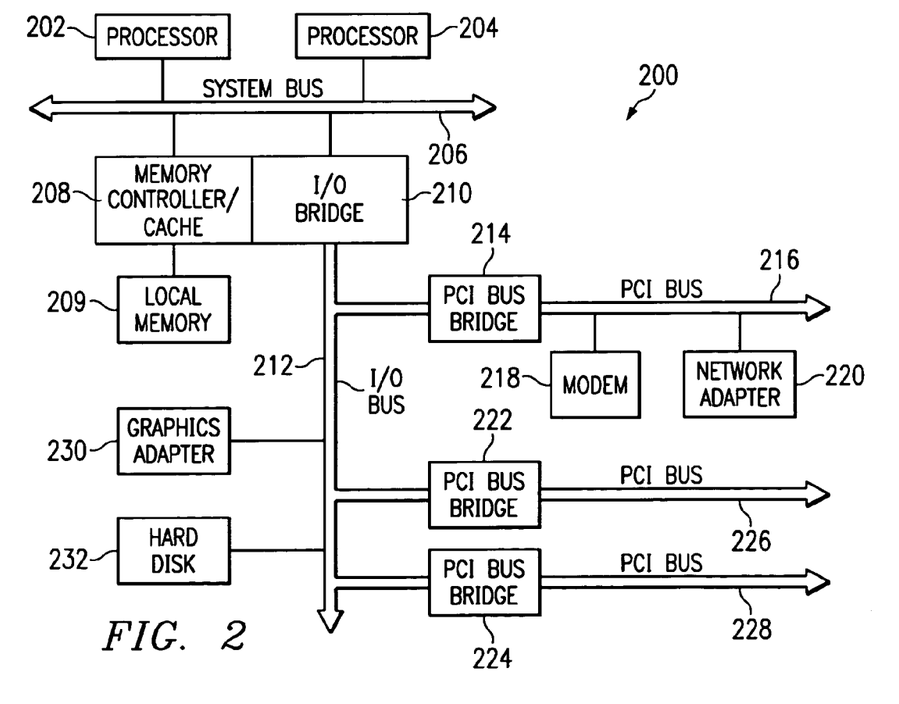
FIG. 2 is an exemplary block diagram of a server according to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards. Additional PCI bus bridges 222 and 224 provide interfaces for additional PCI buses-226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

Figure 3:
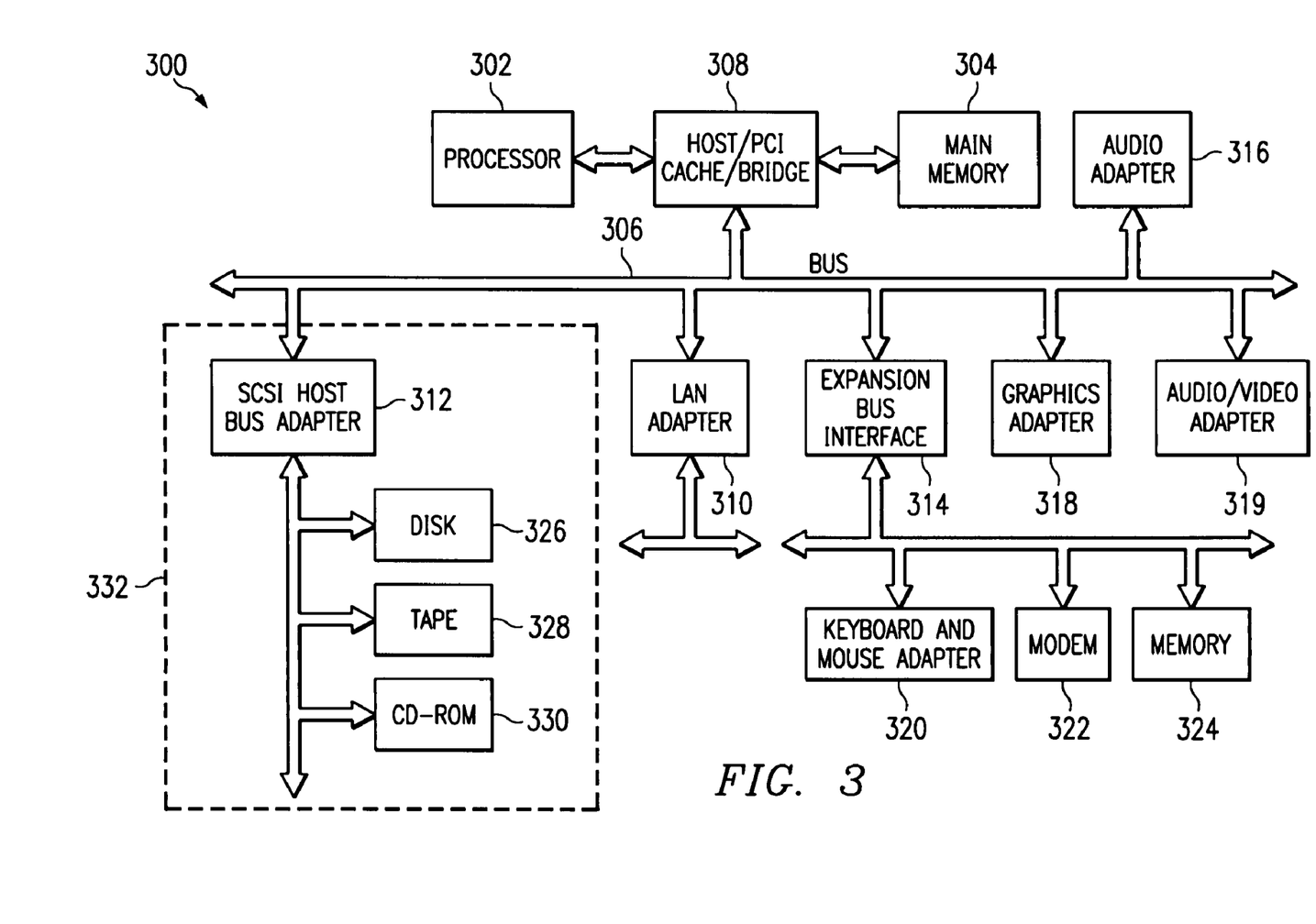
FIG. 3 is an exemplary block diagram of a client according to the present invention.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used.

Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324.

In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Java Database Connectivity (JDBC) application interfaces are used to communicate with the relational database. JDBC application interfaces are application interfaces that are used to access heterogeneous databases in a transparent manner. JDBC is described in "Core JAVA 2," Cay S. Horstmann et al., Sun Microsystems Press, 2000, pages 203–253, which is hereby incorporated by reference.

While the present invention will be described with reference to preferred embodiments in which Java applications and Java objects are utilized, the invention is not limited to the use of the Java programming language. Rather, any programming language may be utilized with the principles of the present invention. The only requirement is that there must be some means for obtaining the structure of the relational database. For example, the present invention may be implemented using Microsoft Open Database Connectivity (ODBC). The ODBC driver provides links to such server/client database systems as Oracle and SQL Server and to desktop database systems such as dBASE and FoxPro.

The present invention may be implemented either at the server, such as server 104, or at a client device, such as client device 110. In other words, a data representation of an object may be deleted either on the client or the server. For example, if the system makes use of a traditional client/server application, the present invention may be implemented at the client device. If the system makes use of a three-tier application, the present invention may be implemented at a server. The traditional client/server application and the three-tier application will be discussed in greater detail hereafter. For purposes of the following description, it will be assumed that the tools according to the present invention are present at the client device.

Furthermore, the client and server devices may be implemented as client and server processes on the same physical device. Thus, with regard to the descriptions of the preferred embodiments herein, client and server may constitute separate remote devices or the same device operating in two separate capacities.

The present invention is implemented as application tools running on the client device or server. Thus, the application tools according to the present invention may be stored, for example, in local memory 209 or 324. The application tools are implemented by either the processor 202, 204 or 302 and make use of network connections via either the network adapter 220, LAN adapter 310 or modem 218 or 322.

Figure 4:
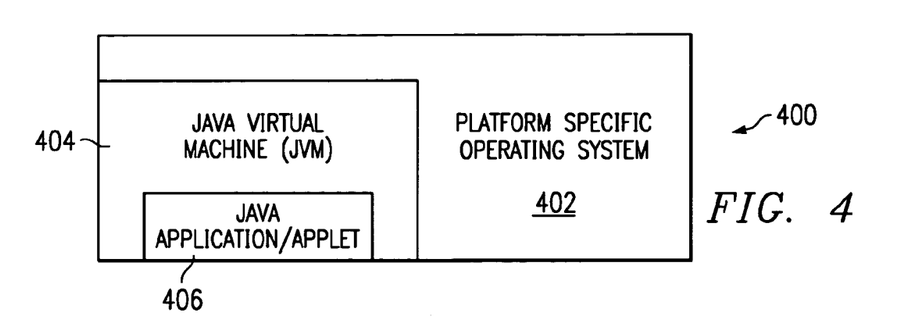
FIG. 4 is a block diagram illustrates the relationship of software components operating within a computer system that may implement the present invention.

With reference now to FIG. 4, a block diagram illustrates the relationship of software components operating within a computer system that may implement the present invention. Java-based system 400 contains platform specific operating system 402 that provides hardware and system support to software executing on a specific hardware platform. JVM 404 is one software application that may execute in conjunction with the operating system. JVM 404 provides a Java run-time environment with the ability to execute Java application or applet 406, which is a program, servlet, or software component written in the Java programming language. The computer system in which JVM 404 operates may be similar to data processing system 300 or computer 200 described above. However, JVM 404 may be implemented in dedicated hardware on a so-called Java chip, Java-on-silicon, or Java processor with an embedded pico-Java core.

JVM 404 is the center of a Java run-time environment and supports all aspects of Java's environment, including its architecture, security features, mobility across networks, and platform independence.

JVM 404 is a virtual computer that executes Java programs. JVM 404 is in essence a computer that is specified abstractly. The JVM loads class files and executes the bytecodes within them.

The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates bytecode instructions, which are in an architecture-neutral file format. A "bytecode" instruction is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Bytecodes also may be translated into native code, computer specific instructions, by a just-in-time compiler (JIT).

The Java Database Connectivity (JDBC) kit was developed for Java for allowing programmers to connect to a database and query it or updated it using the Structured Query Language (SQL). JDBC can be used in both Java applications and applets. These applications and applets can be implemented as a traditional client/server program, as shown in FIG. 5A, or as a three-tier application as shown in FIG. 5B.

Figure 5A:
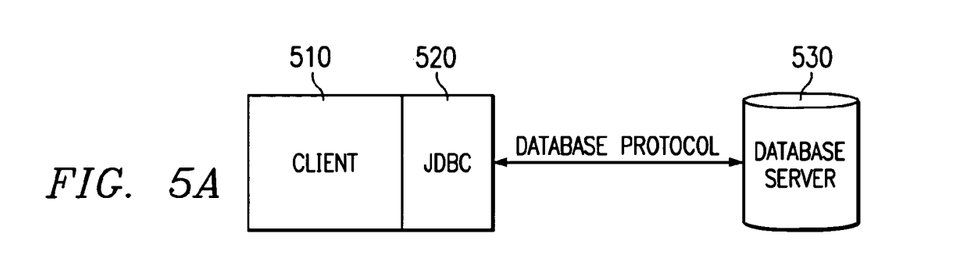
FIGS. 5A and 5B are exemplary diagrams illustrating paths taken by requests and commands to use information stored in a relational database resident on a database server.

As shown in FIG. 5A, in a traditional client/server program, the client 510 uses JDBC 520 to establish a communication connection with the database server 530 using a database protocol. In a three-tier application as shown in FIG. 5B, the client 540 does not make database calls. Instead, the client 540 calls on a middleware layer 550 on the server that in turn makes the database queries using JDBC 560.

The three-tier model separates the visual presentation from the business logic, i.e. the Java applications, and the raw data in the database 570. Therefore, it becomes possible for the same data and same business rules to be access from multiple clients. Communication between the client 540 and the middle tier 550 can occur by using various protocols such as HTTP, RMI, and the like. Communication between the Middle Tier 550 and the Database Server 570 occurs using JDBC 560 and a database protocol.

Figure 5B:
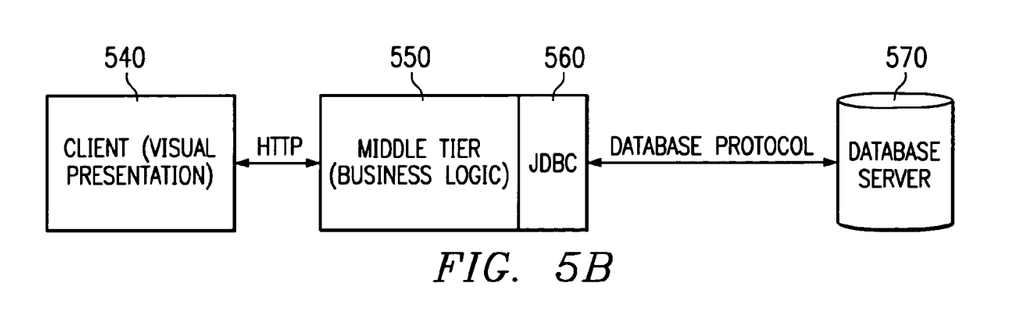

The present invention is equally applicable to either the client/server or the three-tier structure shown in FIGS. 5A and 5B. For purposes of illustration, it will be assumed with regard to the embodiments described herein that the traditional client/server structure is utilized. The present invention provides a mechanism by which object data in a relational database, i.e. objects stored as records in the relational database, may be deleted with appropriate processing of other object data that are linked to the deleted object data. When the terms "object data stored in a relational database," "object data in a relational database", or the like, are used herein, what is meant is that the data representations of the objects are stored as records in a relational database and the deletion of the "object data" is the deletion of the data representations of the objects from the relational database.

Figure 6:
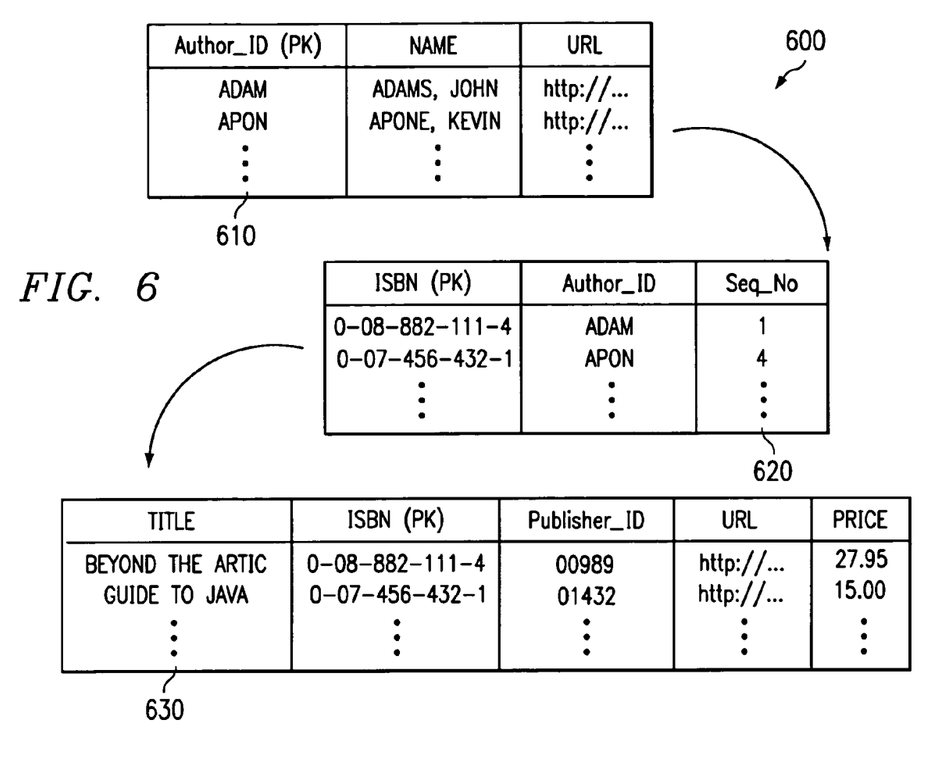
FIG. 6 is an exemplary diagram illustrating a relational database.

FIG. 6 is an exemplary illustration of a simplified relational database according to the present invention. The relational database is utilized in an object-relational system, i.e. a system in which applications operate on objects which are mapped to the corresponding data representations, i.e. records, in tables of a relational database. As shown in FIG. 6, the relational database is comprised of a plurality of tables 610–630 which are linked based on common attributes shown as columns in the tables.

Table 610 includes information identifying authors. The table 610 includes such information as the author identification, the author's name, and a uniform resource locator (URL) associated with the author. The author record is a data representation of an author object that may be utilized by a Java application.

The primary key (PK) of the table 610 is the Author_ID. The primary key is the attribute that uniquely identifies a record in the table. Thus, the Author_ID in table 610 is the primary key since multiple authors may have the same name but will have different Author_IDs.

Table 620 includes information identifying book authors. The table 620 includes such information as the ISBN of the book(s) authored by the author, the author's Author_ID, and a Seq_No. for the author. The primary key for the records in table 620 is the ISBN. In addition, table 620 includes the foreign key Author_ID. A foreign key is a primary key of one table that is present in another table. The tables 610–620 are linked by way of their primary and foreign keys.

Table 630 includes information identifying books. The table 630 includes such information as the Title of the book, the ISBN, the Publisher_ID, an associated URL, and a price for the book. The primary key for the records in the table 630 is the ISBN since this attribute uniquely identifies a book in the table 630. The ISBN is also the foreign key for table 630 in that the ISBN is also a primary key for table 620.

Thus, based on the primary and foreign keys of the tables 610–630, the book author object data in table 620 may exist independently of the author object data in table 610. In other words, the primary key of the table 610, i.e. the foreign key in table 620, is not a proper subset of the primary key of table 620. However, the book object data in table 630 are not independent of the book author object data in table 620. That is, the primary key of table 620, i.e. the foreign key in table 630, is a proper subset of the primary key of table 630. A foreign key is a "proper subset" of the primary key if the foreign key includes some or all of the primary keys of the table.

Therefore, if an object in table 610 is to be deleted, such as the author "Adams, John", the book author object data corresponding to "Adams, John" in table 620 may be deleted or its link to the object data in table 610 may be severed. If object data in the table 620 is deleted, linked object data in table 630 must be deleted also. The present invention provides a mechanism for performing this deletion of objects and dealing with their dependencies.

The JDBC kit (APIs) provides a mechanism for providing information about the structure of a relational database and its tables. For example, a user can get a list of tables in a particular relational database, the column names, types of tables, and the like. This information is known as JDBC database metadata. While the JDBC kit is utlized in the descriptions of the preferred embodiments herein, it should be appreciated by those of ordinary skill in the art that the JDBC kit is only an exemplary mechanism for providing structure information of a relational database and other mechanisms may be employed without departing from the spirit and scope of the present invention.

The present invention receives this JDBC database metadata as input and creates a markup language file describing the database dependency information of the various tables in the relational database. The markup language file is created by parsing the JDBC database metadata to identify the link relationships between tables in the relational database. These link relationships may be identified based on primary keys and foreign keys as discussed above. Based on these link relationships, a markup language file describing the structure of the relational database and the links between tables as table definitions is generated. In addition, default delete actions are determined based on the link relationships and delete action identifiers are added to the markup language file table definitions.

The delete actions are derived by heuristics which are discussed later. The invention uses this markup language file information to generate a database metainformation class that can be used at run time by a delete DBManager to perform deletion of object data in the relational database.

Figure 7:
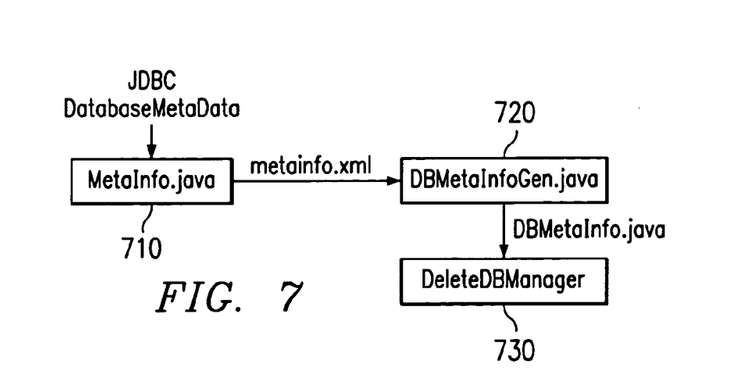
FIG. 7 is an exemplary block diagram illustrating the components and data path according to the present invention.

FIG. 7 is an exemplary block diagram illustrating the operation of the present invention. As shown in FIG. 7, JDBC DatabaseMetaData is input to the Metainfo.java tool 710. The Metainfo.java tool 710 operates on the JDBC DatabaseMetaData to generate a markup language file containing dependency information regarding the relational database defined by the JDBC DatabaseMetaData. The depicted example shows an Extensible Markup Language (XML) file is created, however, other representations may be used without departing from the spirit and scope of the present invention.

The metainfo.xml file is input to the DBMetaInfoGen.java tool 720 which operates on the metainfo.xml file to generate a DBMetainfo.java class. The DBMetainfo.java class is used by a DeleteDBManager tool 730 during runtime to delete object data from the relational database and perform appropriate processing of remaining linked object data. Thus, in one particular embodiment, the present invention includes a suite of tools 710–730 that provide a mechanism by which data representations of objects may be deleted from a relational database while appropriately handling linked object data and dependencies in the relational database in a customizable manner.

Figure 8A:
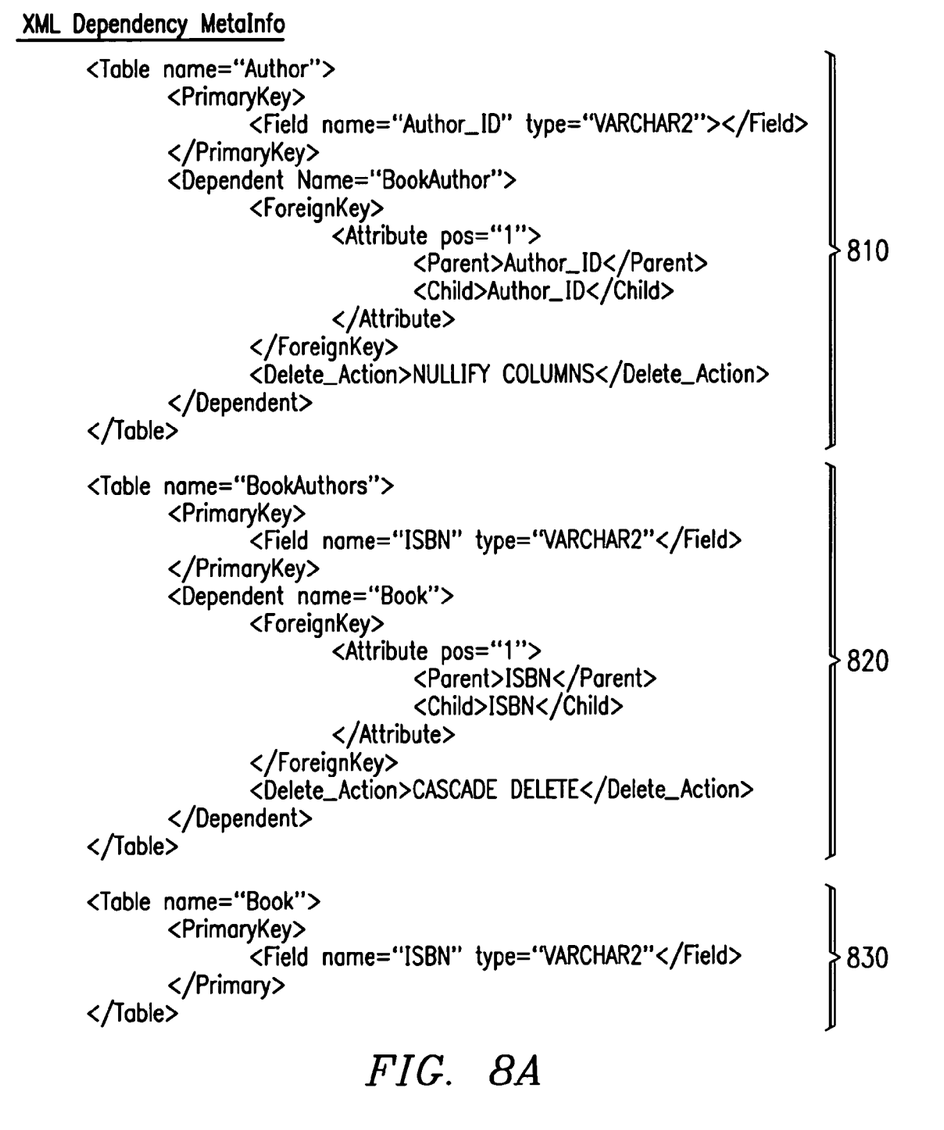
FIG. 8A is an exemplary diagram of a portion of the metainfo.xml file showing the dependency relationship of the relational database of FIG. 5 described in an XML format.

The metainfo.xml file designates the dependencies between tables of the relational database and the type of deletion that is to be performed. FIG. 8A shows an example of the metainfo.xml file that corresponds to the relational database illustrated in FIG. 6.

As shown in FIG. 8A, the metainfo.xml file includes a table name, a listing of primary keys, a dependent table name, foreign keys for the dependent table, and a delete action identifier for each table 810–830 as appropriate. The primary keys designate the key attributes of the table. The dependent table name designates the table(s) that are dependent on the defined table. The foreign key designates the relationship with the dependent table(s). The primary keys and foreign keys of tables in the relational database are designated by the creator of the relational database at the time the tables are created. The delete action identifier identifies one of two types of actions that are to be performed when a data representation of an object is deleted from the defined table: Cascade delete or Nullify_Columns delete.

Cascade delete is a deletion in which the parent object data is deleted and the child object data are deleted recursively, i.e. all child object data is deleted unless the cascade delete action is overridden in a table definition of a dependent table. Nullify_Columns action involves deleting the parent object data but allowing the child object data to remain in the relational database. The type of deletion is automatically set to a default type by applying certain heuristics on the JDBC DatabaseMetaData received as input. These heuristics are discussed in greater detail below.

If the DatabaseMetaData indicates that a dependent table contains a foreign key that is a proper subset of the primary key of the dependent table, the deletion type is set to Cascade delete. This is defined as an identifying relationship, i.e. the child object data cannot exist without the parent object data.

If the DatabaseMetaData indicates that a dependent table contains a foreign key that is not part of its primary key of the dependent table, the deletion type is set to Nullify_Columns delete. This is defined as a non-identifying relationship, i.e. the child object data can exist without the parent object data. Thus, the delete action depends on the table-dependent table pair, and not just the table alone.

As shown in FIG. 8A, the particular delete actions indicate that a Nullify Columns delete action of BookAuthor object data that is dependent on object data in the Author table element 810 is performed. However, a cascade delete is performed with regard to Book object data that is dependent on object data in the BookAuthor table element 820. Thus, if a book author is to be deleted from table element 820, which corresponds to table 620 in FIG. 6, the book object data in table 630 linked to the book author object data in table 620 will be deleted due to the Cascade delete action. However, if an author is to be deleted from table 810, the book author object data in BookAuthor table element 820 that is linked to the author object data in Author table element 810 will not be deleted, only their links to the deleted author object data will be nullified. In this way, the book author object data may remain even though the parent object data has been deleted.

The delete action may also be based on user override of default delete actions. For example, the user may edit the metainfo.xml file using an editor to manually select and change the delete action identifier. Alternatively, the user may perform the delete action selection using a graphical user interface.

For example, the graphical user interface may be incorporated with the metainfo.java tool and may graphically depict in a tree-like manner, the various tables and their dependencies with links between tables being labeled with a corresponding delete action identifier. The user may then select a link and choose a delete action from, for example, a pull-down menu or the like. Other forms of graphical user interfaces may be utilized without departing from the spirit and scope of the present invention. In this way, the user may customize the deletion of objects from a relational database at an object level.

In addition to customizing the particular delete actions performed on data representations of objects in tables of the relational database, the present invention provides a user the ability to insert deletion constraints into the metainfo.xml file.

Figure 8B:
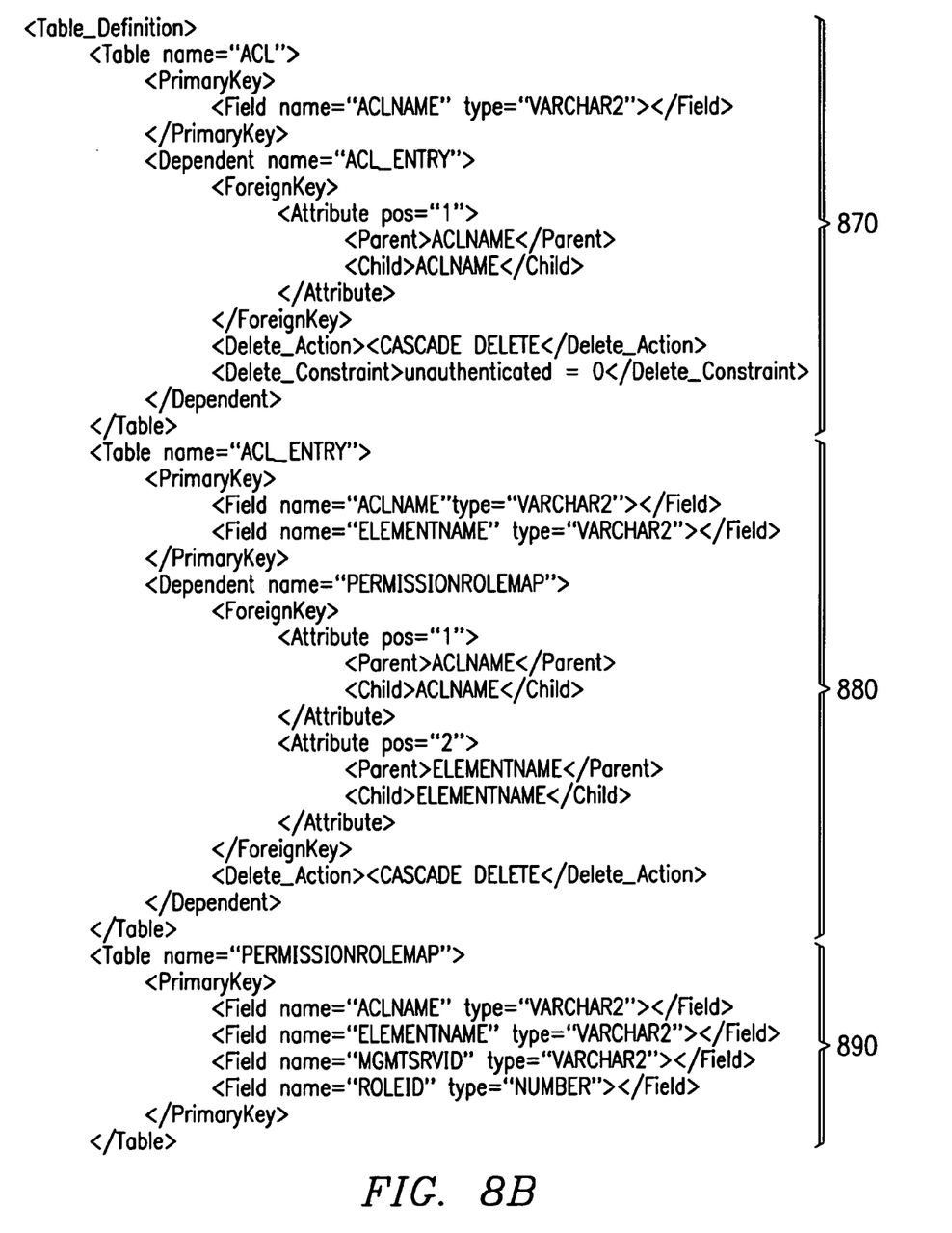
FIG. 8B is another exemplary diagram of a portion of the metainfo.xml file illustrating the customizability of the present invention.

While the example in FIG. 8A is directed to a book-author application, it should be appreciated that the present invention is not limited to any particular application. Rather, the present invention may be used in many different areas in which relational databases may be used. For example, the present invention may be utilized in a system for administrating user access to system resources, such as in a network environment. FIG. 8B shows another example of the metainfo.xml file according to the present invention as applied to a user access control system in a network environment. The particular example shown in FIG. 8B includes a deletion constraint which has been added by a user, in accordance with a further feature of the present invention.

In the depicted example, an ACL identifies an access control list for a service that is provided. The ACL includes an ACLNAME that identifies the name of a particular service that is provided, such as a scheduler. The service is comprised of a number of methods, or functions, that may be performed. These methods are identified by their ELEMENTNAMEs. Because there may be more than one ACL having methods with the same ELEMENTNAME, an ACL_ENTRY table is provided to uniquely identify the combination of ACL and ELEMENTNAMEs.

The PERMISSIONROLEMAP table identifes the roles, e.g., network administrator, that are provided access to the various services and methods. These roles are identified by their management server identification MGMTSRVID and their role identification ROLEID.

As shown in FIG. 5B, the particular example shown is directed to a relational database having tables 870–890 representing Access Control Lists (ACLs) and ACL entries, respectively. ACLs are used to control access to services, such as network services.

The table 870 is the parent table of tables 880–890 and is defined in the metainfo.xml file to have a primary key of ACLNAME with the foreign key of the dependent table 880 also being ACLNAME. Since the foreign key (ACLNAME) is a proper subset of the primary key of ACL_ENTRY (ACLNAME, ELEMENTNAME), the type of delete action is set to Cascade delete.

The table 880 (ACL_ENTRY) is a dependent, or child, table of the table 870 and is defined in the metainfo.xml file to have primary keys of ACLNAME and ELEMENTNAME. The foreign key in the PERMISSIONTROLEMAP table is the combination of ACLNAME and ELEMENTNAME as well. Since the foreign key in the PERMISSIONROLEMAP table is a proper subset of its primary key, the delete action is set to Cascade delete.

However, a delete constraint has been added by a user by, for example, using an editor or graphical user interface as described above. The delete constraint is 'unauthenticated=0' in table 870, meaning that only authenticated ACL entries may be deleted. Thus, with the delete constraint in effect, a cascade delete is performed on all authenticated ACL entries whose ACL object data in table 870 is deleted. Non-authenticated ACL entries will not be deleted by the cascade delete action.

Although FIG. 8B only shows a single delete constraint, multiple delete constraints may be "strung together" to provide a highly customizable delete action. The stringing together of delete constraints may make use of any type of Boolean operation, such as AND, OR and the like.

The default Nullify_Columns action can be overridden by the user and changed to Cascade_delete. However, the converse is not possible. This is because a primary key column cannot be nullified. If a primary key column were nullified, the object would not appear to exist.

For example, if a user's identity is stored in a relational database table that has a social security number as a primary key, nullifying the social security number primary key of the data representation of the user will cause the user's identity to appear not to exist. This is because the user's identity can no longer be retrieved from the table since the table is keyed by the social security number. For this reason, the delete actions is limited such that a user cannot nullify a primary key attribute of a record in a table of the relational database.

The metainfo.xml file is provided to the DBMetaInfo-Gen.java tool to generate the DBMetaInfo.java class. The DBMetaInfo.java class is a Java class that encapsulates the metainfo.xml file and contains the dependency information for the relational database.

When a user wishes to delete an object from the relational database, the user makes use of a DeleteDBManager application programming interface (API) to invoke the DeleteDBManager tool. This process involves designating the table and key attribute value for the object that is to be deleted.

The DeleteDBManager tool parses that DBMetaInfo.java file for the specified table and performs an appropriate delete action based on the delete action identifier associated with the specified table.

The deletion is actually performed by generating SQL statements that are executed to perform the operations of deleting the specified object. SQL statements provide a means by which object data can be stored, deleted and modified in a relational database. SQL statements are described in general in the above referenced "Core Java 2" text, which is incorporated by reference.

If the desired delete action is Nullify_Column, a SQL query, such as "update<childtable> set <foreignkey-field>=null," is generated. If the desired action is Cascade delete, a determination is made as to whether the relationship between the child table and the parent table is an identifying or non-identifying relationship. By "identifying" relationship, what is meant is that the foreign key of the child table is a proper subset of its primary key. A non-identifying relationship is then a relationship in which the foreign key of the child table is not a proper subset of its primary key.

If the relationship is an identifying relationship, an SQL statement such as
   delete from <childtable> where <foreignkey-field>=<value> is generated. If the relationship is a non-identifying relationship, a nested SQL statement such as
   delete from <childtable> where <field-child> in (select <field-parent> from <parent> where <primarykey-field>=<value>)

is generated. This SQL statement may be much more complicated depending on the depth of the dependency in the relational database.

In addition, if the delete action has been constrained by insertion of a delete constraint by a user, the SQL statement will reflect the delete constraint. For example, the delete constraint provided in FIG. 8 constraining the delete action to ACL entries that are authenticated would result in an SQL statement of the type:
   delete from ACL_ENTRY where ACLNAME in ('Launcher') and unauthenticated=0
   where 'Launcher' is the name of the ACL being deleted in this example.

The SQL statements instruct the database server to perform the functions of deletion and updating of object data in the relational database to either delete the object data or set a foreign key in the object data to a value of null. In this way, object data may be deleted from a relational database with appropriate processing of linked object data in the relational database. These operations are performed within database transactional boundaries to ensure the integrity of the database (Note that JDBC supports APIs that allow the user to specify the beginning and end of a transaction).

Figure 9:
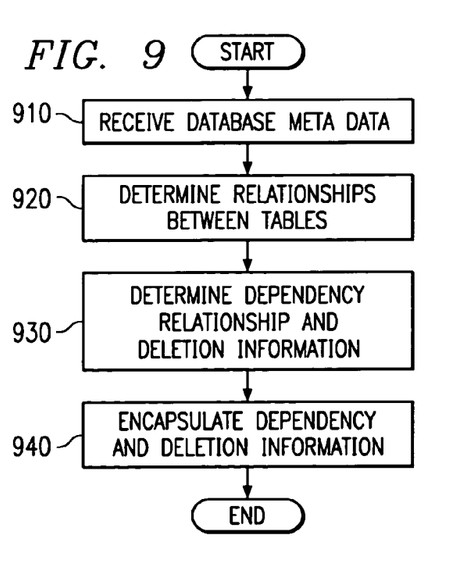
FIG. 9 is a flowchart outlining an exemplary operation of the present invention when creating the metainfo.xml file and generating the metainfo.java class.

FIG. 9 is a flowchart outlining an exemplary operation of the present invention when forming the metainfo.xml file and generating the DBMetaInfo.java class. As shown in FIG. 9, the operation starts with receiving the JDBC DatabaseMetaData file as input (step 910). The JDBC DatabaseMetaData file is then parsed to determine the relationships between the various tables in the relational database and their structures (step 920).

Thereafter, based on the structure of the relational database discerned from the JDBC DatabaseMetaData file, the dependency structure of the relational database is identified and written to the metainfo.xml file (step 930). This step may also include editing by the user to change the default delete actions and/or insert delete constraints, as described above. The metainfo.xml file is then encapsulated into a DBMetaInfo.java class object (step 940) and the operation ends.

Figure 10:
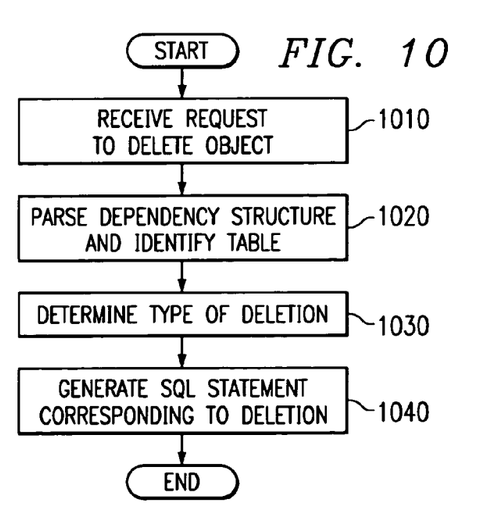
FIG. 10 is a flowchart outlining an exemplary operation of the present invention when using the metainfo.java class to perform deletion of an object in a relational database.

FIG. 10 is a flowchart outlining an exemplary operation of the present invention when using the DBMetaInfo.java class object to perform object data deletion. As shown in FIG. 10, the operation starts when a delete operation request is received indicating the table and object data to be deleted (step 1010). The dependency structure in the DBMetaInfo.java class is parsed until the indicated table is found (step 1020).

Once the indicated table is found, it is determined what type of deletion is to be performed on the object data in the table (step 1030). As mentioned above, this is determined based on the delete action identifier in the encapsulated metainfo class. Thereafter, an appropriate SQL statement is generated and sent to the database server to perform the deletion action (step 1040). As mentioned above, the SQL statement generated is specific to whether the delete action is a nullify_columns, a cascade deletion of an identifying relationship, or a cascade deletion of a non-identifying relationship. The operation then ends.

Thus, with the present invention object data may be deleted from a relational database at the object level with linked object data being properly deleted or modified to account for the deletion of the object data. Since this deletion is performed at the object level, the deletion is database independent. In other words, the principles of the present invention are applicable to a plurality of different types of relational databases regardless of the particular protocols used by the relational databases.

The invention provides an added advantage over the prior art in that it is functional in a distributed heterogeneous database environment. This is because the invention does not rely on database-specific constructs. Thus, for example, the present invention may be utilized to perform deletion of object data in both an Oracle relational database and a IBM DB2 relational database. The only constraint on the type of relational database with which the preferred embodiments of the present invention may be utilized, is that the relational database should be able to perform the delete actions based on SQL statements forwarded to the relational database.

However, the present invention is not limited to the use of SQL statements and may alternatively use other types of formatted command statements to effectuate deletion of object data in relational databases. The advantages of the present invention of identifying delete actions based on the structure of the relational database discerned from database metadata, the ability for a user to customize the delete actions, the encapsulation of the relational database structure and delete actions into a class object, and the use of the class object to perform delete operations is not dependent on the type of delete commands eventually provided to the relational database server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art.

For example, while the present invention has been described in terms of two types of delete actions, other delete actions that may be desirable may be included in the present invention. For example, rather than nullifying a foreign key of a dependent table object, the foreign key may be set to another desired value other than null. The desired value may be determined based on the particular application to which the creator of the relational database is concerned. This may be performed by extending the delete action identifiers to include other delete action identifiers. Furthermore, additional constraints may be specified for a delete action, e.g., in the book example, deleting an author may result in deletion of books only if the Publisher_ID is a specified value and the price of the book is below a certain value. Any number of possible delete actions and constraints may be supported by the present invention.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of deleting object from a relational database, comprising:
    determining a structure of the relational database, wherein determining the structure of the relational database includes referring to a database meta-information class object associated with the relational database; wherein the database meta-information class object is generated based on a file describing the structure and delete actions for tables in the relational database;
    determining a delete action based on the structure of the relational database as described in the database meta-information class object;
    generating database modification commands based on the determined delete action; and
    sending the database modification commands to a relational database server, wherein the relational database server deletes the object data from the relational database based on the database modification commands.

2. The method of claim 1, wherein the database meta-information class object encapsulates a dependency structure of the relational database.

3. The method of claim 2, wherein the database meta-information class object further includes a delete action identifier for each dependent table of a plurality of tables in the relational database.

4. The method of claim 3, wherein the delete action identifier is one of cascade delete and nullify columns delete.

5. The method of claim 1, wherein the delete action is one of cascade delete and nullify columns delete.

6. The method of claim 1, wherein the file is an Extended Markup Language file.

7. The method of claim 1, wherein the file is further generated based on user input to override default delete action identifiers in the file.

8. The method of claim 1, wherein the file is further generated based on user input to insert one or more delete constraints in the file for one or more of the tables in the relational database.

9. The method of claim 1, wherein the database modification commands are Structured Query Language (SQL) statements.

10. A data processing system for deleting object data from a relational database, comprising:
    a data processor; and
    a relational database storage device, wherein the data processor determines a structure of the relational database, wherein the data processor determines the structure of the relational database by referring lo a database meta-information class object associated with the relational database; wherein the database meta-information class object is generated based on a file describing the structure and delete actions for tables in the relational database, determines a delete action based on the structure of the relational database as described in the meta-information class object, generates database modification commands based on the determined delete action and sends the database modification commands to the relational database storage device, wherein the relational database storage device deletes the object data from the relational database based on the database modification commands.

11. The data processing system of claim 10, wherein the database meta-information class object encapsulates a dependency structure of the relational database.

12. The data processing system of claim 11, wherein the database meta-information class object further includes a delete action identifier for each table of a plurality of tables in the relational database.

13. The data processing system of claim 12, wherein the delete action identifier is one of cascade delete and nullify columns delete.

14. The data processing system of claim 10, further comprising a file editor application executed by the data processor, wherein the file editor application changes the delete action in the file for one or more of the tables in the relational database based on a user input to override default delete action identifiers in the file.

15. The data processing system of claim 14, wherein the file editor application inserts one or more delete constraints into the file for one or more of the tables in the relational database, based on a user input.

16. A method of generating a class object for deletion of data representations of objects in a relational database, comprising:
   determining a structure of a relational database;
   determining one or more delete actions based on the structure of the relational database;
   generating a class object based on the determine structure and the determined one or more delete actions; and
   wherein the structure of the relational database and the one or more delete actions are determined from a file describing the structure and delete actions for tables in the relational database.

17. The method of claim 16, wherein generating the class object includes encapsulating information identifying the structure of the relational database and the one or more delete actions.

18. The method of claim 17, wherein the one or more delete actions is at least one of cascade delete and nullify columns delete.

19. The method of claim 16, wherein the one or more delete actions is at least one of cascade delete and nullify columns delete.

20. The method of claim 16, wherein the file is further generated based on user input to override default delete action identifiers in the file.

21. The method of claim 16, wherein the file is further generated based on user input to insert one or more delete constraints in the file.

22. An apparatus for generating a class object for deletion of data representations of objects in a relational database, comprising:
   means for determining a structure of a relational database;
   means determining one or more delete actions based on the structure of the relational database;
   means generating a class object based on the determine structure and the determined one or more delete actions; and
   wherein the means for determining the structure of the relational database and the means for determining the one or more delete actions determine the structure and one or more delete actions from a file describing the structure and delete actions for tables in the relational database.

23. The apparatus of claim 22, wherein the means for generating the class object encapsulates information identifying the structure of the relational database and the one or more delete actions.

24. The apparatus of claim 23, wherein the one or more delete actions is at least one of cascade delete and nullify columns delete.

25. The apparatus of claim 22, wherein the one or more delete actions is at least one of cascade delete and nullify columns delete.

26. The apparatus of claim 22, further comprising means for generating the file, wherein the file is generated based on Java Database Connectivity (JDBC) database metadata associated with the relational database.

27. The apparatus of claim 22, wherein the file is further generated based on user input to override default delete action identifiers in the file.

28. The apparatus of claim 22, wherein the file is further generated based on user input to insert one or more delete constraints in the file.

29. A computer program product in a computer readable medium for generating a class object for deletion of data representations of objects in a relational database, comprising:
   first instructions for determining a structure of a relational database;
   second instruction for determining one or more delete actions based on the structure of the relational database;
   third instructions for generating a class object based on the determine structure and the determined one or more delete actions; and
   wherein the first and second instructions determine the structure of the relational database and the one or more delete actions from a file describing the structure and delete actions for tables in the relational database.

30. The computer program product of claim 29, wherein the third instructions include instructions for encapsulating information identifying the structure of the relational database and the one or more delete actions.

31. The computer program product of claim 30, wherein the one or more delete actions is at least one of cascade delete and nullify columns delete.

32. The computer program product of claim 29, wherein the one or more delete actions is at least one of cascade delete and nullify columns delete.

33. The computer program product of claim 29, further comprising fourth instructions for generating the file based on Java Database Connectivity (JDBC) database metadata associated with the relational database.

34. The computer program product of claim 29, wherein the fourth instructions further include instructions for generating the file based on user input to override default delete action identifiers in the file.

35. The computer program product of claim 29, wherein the fourth instructions further include instructions for generating the file based on user input to insert delete action constraints in the file.

36. A computer program product in a computer readable medium for generating a class object for deletion of data representations of objects in a relational database, comprising:
   a meta-information class for determining a structure of the relational database and one or more delete actions based on the structure of the relational database; and
   a database meta-information generator class for generating class object based on the determined structure and the determined one or more delete actions, wherein the database meta-information generator class encapsulates information identifying the structure of the relational database and the one or more delete actions into the class object.

37. The computer program product of claim 36, wherein the one or more delete actions is at least one of cascade delete and nullify columns delete.

38. A method of generating a class object for deletion of data representations of objects in a relational database, comprising:
   determining a structure of the relational database;
   determining one or more default delete actions based on the structure of the relational database;
   receiving user input to modify the one or more default delete actions;

generating a class object based on the determined structure, the determined one or more delete actions and the user input; and wherein the structure of the relational database and the one or more delete actions are determined from a file describing the structure and delete actions for tables in the relational database.

39. The method of claim 38, wherein the user input overrides one or more of the one or more default delete actions.

40. The method of claim 38, wherein the user input inserts one or more delete action constraints.

* * * * *